United States Patent [19]

Heiland et al.

[11] Patent Number: 5,060,483

[45] Date of Patent: Oct. 29, 1991

[54] TWIN RINSE COLUMNS FOR FREEZE CONCENTRATION OF RINSABLE CONCENTRATES

[75] Inventors: Wolfgang K. Heiland, Trevose; E. Richard Radewonuk, Crum Lynne, both of Pa.

[73] Assignee: The United States of America as represented by the Secretary of Agriculture, Washington, D.C.

[21] Appl. No.: 592,735

[22] Filed: Oct. 4, 1990

[51] Int. Cl.$^5$ .............................................. B01D 9/04
[52] U.S. Cl. ..................................... 62/123; 210/354; 210/359
[58] Field of Search ....................... 210/354, 359, 414; 62/123, 532, 542

[56] References Cited

U.S. PATENT DOCUMENTS

| | | | |
|---|---|---|---|
| 2,615,794 | 10/1952 | Shelby | 210/359 X |
| 2,663,429 | 12/1953 | Bossard | 210/354 X |
| 3,049,889 | 8/1962 | Carfagno | 62/123 X |
| 3,259,181 | 7/1966 | Ashley et al. | 62/123 X |
| 3,448,858 | 6/1969 | Dulcellier et al. | 210/354 X |
| 3,501,924 | 3/1970 | Ashley | 62/123 |
| 4,420,403 | 12/1983 | Tufts | 210/354 X |
| 4,448,688 | 5/1984 | Havlis | 210/354 X |

OTHER PUBLICATIONS

J. G. Muller, "Freeze Concentration of Food Liquids: Theory, Practice, and Economics," Food Technol. 21: 49–61 (Jan. 1967).

Primary Examiner—William E. Tapolcai
Attorney, Agent, or Firm—M. Howard Silverstein; John D. Fado; Randall E. Deck

[57] ABSTRACT

An automatic apparatus for the continuous freeze concentration of liquids. The apparatus includes a heat exchanger for freezing the liquid to form a slurry of ice crystals and concentrated liquid. Communicating with the heat exchanger via a line or pipe is at least one, and preferably two, separating and rinsing columns, connected in parallel, to which the slurry is pumped for separating the concentrated liquid from the ice and subsequently rinsing the ice to remove any residual liquid therefrom. First and second receptacles are provided for collecting the concentrated liquid and the ice from the columns, respectively.

22 Claims, 4 Drawing Sheets

TWIN RINSE COLUMNS FOR FREEZE CONCENTRATION OF RINSABLE CONCENTRATES

BACKGROUND OF THE INVENTION

1. Field of the Invention

The invention relates to an apparatus for the freeze concentration of liquids, to remove pure water therefrom in frozen form and thereby make the liquid more concentrated.

2. Description of the Prior Art

Freeze concentration of liquids is a well-known process for the removal of water from aqueous liquids wherein the water is frozen out of the liquid as particles of solid ice. The process finds particular utility in the concentration of food liquids such as fruit juices and skim milk, and in the desalinization of salt or sea water. In practice, the liquid is frozen using either direct contact or indirect contact freezers or chillers to form a slurry of ice crystals and concentrated liquid. These ice crystals may then be separated, providing pure water in frozen form and the concentrated liquid.

Separation of the ice crystals and the concentrate is conventionally accomplished using a centrifuge, a wash column, or a filter press as described by Muller [Food Technology 21(49): 49–61 (January, 1967)].

SUMMARY OF THE INVENTION

We have now invented an apparatus for the freeze concentration of liquids, removing pure water therefrom in frozen form and thereby making the liquid more concentrated. The apparatus includes a heat exchanger for freezing the liquid to form a slurry of ice crystals and concentrated liquid. Communicating with the heat exchanger via a line or pipe is at least one, and preferably two, separating and rinsing columns to which the slurry is pumped for separating the concentrated liquid from the ice and subsequently rinsing the ice to remove any residual liquid therefrom. First and second receptacles are provided for collecting the concentrated liquid and the ice from the columns, respectively.

In the preferred embodiment, at least a pair of columns are employed operating in parallel. One skilled in the art will recognize that by using a plurality of the separation and rinse columns in parallel in this manner, a continuous freeze concentration process may be achieved.

In accordance with this discovery, it is the primary objective of this invention to provide an apparatus for freeze concentration of liquids which allows for more efficient separation and rinsing of the ice crystals than is possible with devices currently in use. The separating and rinsing columns of this invention provide independent control of all process variables, particularly: degree of bed compaction, selection of a variety of rinse fluids (liquids and/or gases) and the sequence thereof, and pressure or vacuum-assisted rinsing. The apparatus is advantageously employed in the processing of liquids where optimal rinsing conditions are subject to change.

Another object of the invention is to provide an apparatus which allows for continuous or batch freeze concentration of liquids.

Other objectives and advantages of the invention will become readily apparent from the ensuing description.

LIST OF REFERENCE NUMERALS

Figure 1:
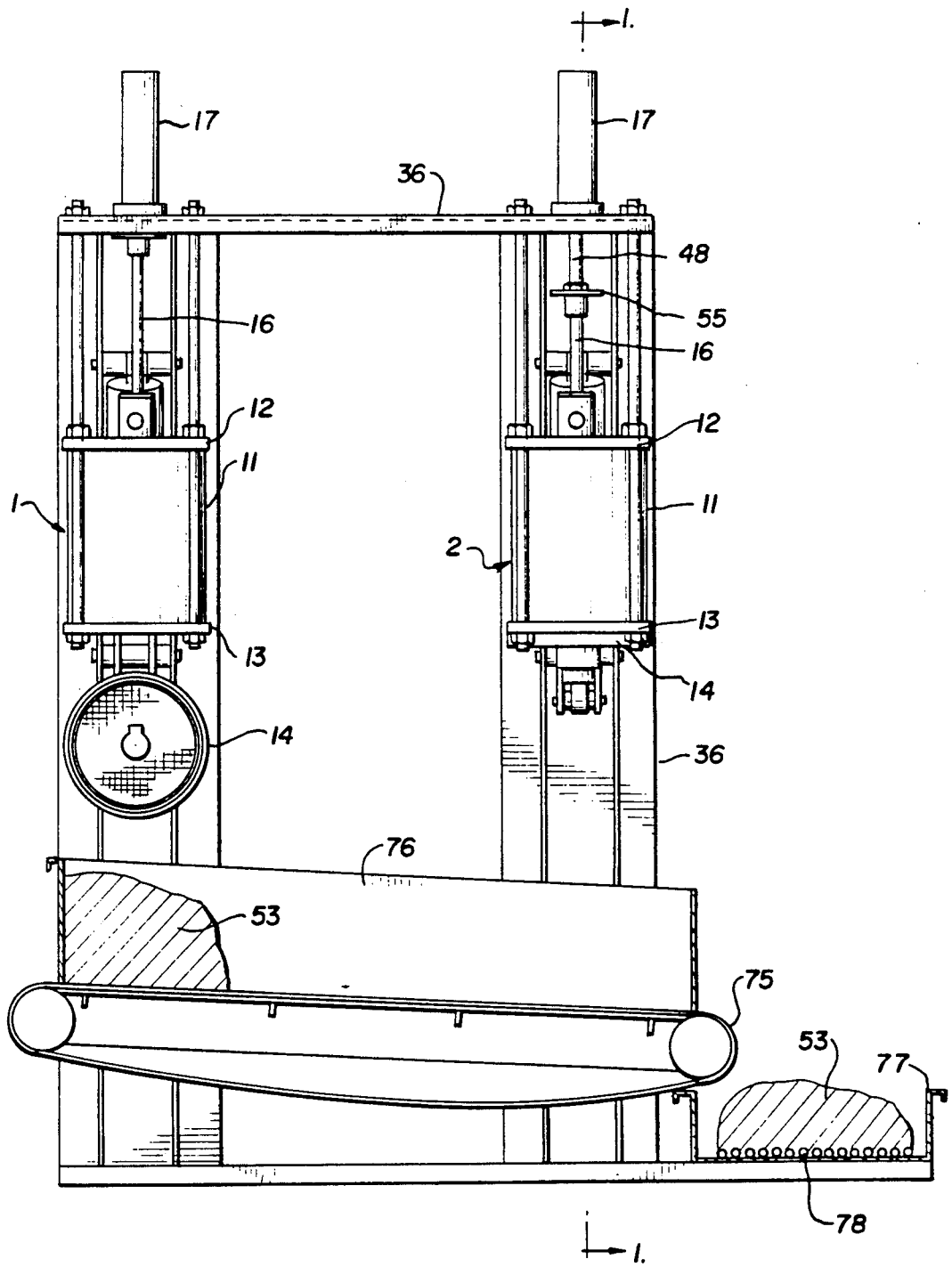
FIG. 1 is a front view of the apparatus having a pair of columns in parallel with the left column in dumping position and the right column being charged.

1—separation and rinse column
2—separation and rinse column
11—hollow chamber
12—top plate
13—annular plate
14—hinged bottom lid
15—reciprocating piston
16—piston rod
17—loading cylinder
18—piston seal
19—bearing
20—shaft seal
21—cover
22—grooves
23—perforations
24—first retaining element
25—second retaining element
26—annular and radial grooves
27—axial holes
28—first conduit
29—second conduit
30—third conduit
30A—annular chamber
31—fourth conduit
32—reciprocating element
33—lid extension
34—clevis
35—pin
36—support frame
37—distributor
38—swing check valve
39—shaft seal
40—collar
41—three-way valve
42—three-way valve
43—slurry
44—heat exchanger or freezer
45—pump
46—coupling
47—locknut
48—piston rod
49—piston
50—port
51—port
52—back pressure valve
53—ice bed or plug
54—concentrated liquid
55—extended washer
56—limit switch
57—timer
58—solenoid
59—solenoid
60—solenoid
61—valve
62—valve
63—air or inert gas 64—first receptacle
65—solenoid
66—pump
67—rinse water
68—melt collection receptacle
69—valve
70—detector
71—port
72—limit switch
73—pressure regulating valve
74—four-way solenoid control valve
75—belt
76—conveyor
77—second receptacle
78—coil
79—solenoid
80—four-way solenoid control valve
81—port
82—valve

DETAILED DESCRIPTION OF THE INVENTION

The apparatus of the present invention was designed for the freeze concentration of liquids, removing pure water therefrom in frozen form and thereby making the liquid more concentrated. While not being limited thereto, the device is especially suited to the concentration of food liquids such as fruit juices or skim milk, the desalinization of sea or salt water, or the dehydration of coffee.

Referring now to the FIGURES, the apparatus includes a heat exchanger or freezer 44; separating and rinsing columns 1,2; and first and second receptacles 64 and 77.

The heat exchanger or freezer 44 is provided for freezing the liquid to form a slurry 43 of ice crystals and concentrated liquid. The heat exchanger may be any direct contact or indirect contact freezer conventional in the art. Suitable heat exchangers include but are not limited to the crystallizers described by Muller (ibid.), the contents of which are herein incorporated by reference.

Communicating with the heat exchanger 44 via a line or pipe is at least one, and preferably two, separating and rinsing columns 1,2 to which the slurry 43 is pumped for separating the concentrated liquid from the ice, and subsequently rinsing the ice to remove any residual liquid therefrom. Each column 1,2 is constructed as a container having a hollow chamber 11 such as a cylinder, a top 12, and a bottom 14 moveable between an open and a closed position. First and second conduits 28,29 communicate with lower and upper portions of the container, respectively, for adding and/or removing fluids from the chamber 11 while the bottom 14 is in a closed position. A check valve 38 is provided on the first conduit 28 for automatically controlling fluid flow. Third and fourth conduits 30,31 are also provided, communicating with the lower and upper portions of the container, respectively, for removing and adding fluids to the chamber. A first retaining element 24, such as a screen or sieve, on the third conduit 30 functions to retain ice crystals within the chamber 11. Inside the container is a reciprocating piston 15 adapted or constructed to allow the passage of liquids and gases through the piston while preventing the passage of ice crystals from the chamber. To retain the ice within the chamber 11, for example, the piston may include perforations 23 having a cross-section effective to allow the passage of liquids and gases while preventing the passage of ice crystals, or in the alternative, a second retaining element 25, such as a screen or sieve having an effective mesh size, may be provided on the piston.

Figure 2:
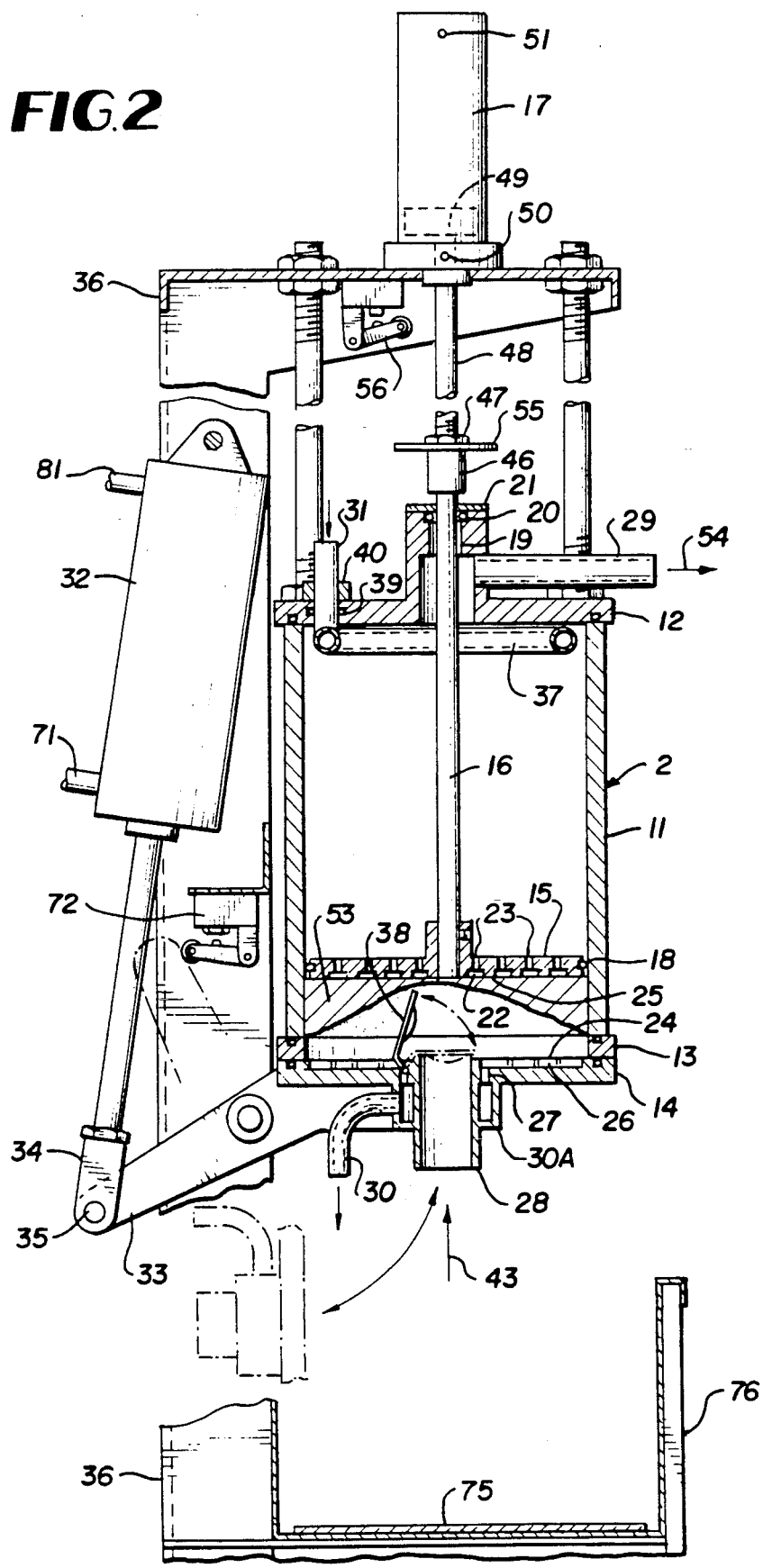
FIG. 2 is a cross-sectional view of the right column taken along line 1—1 of FIG. 1.
Figure 3A:
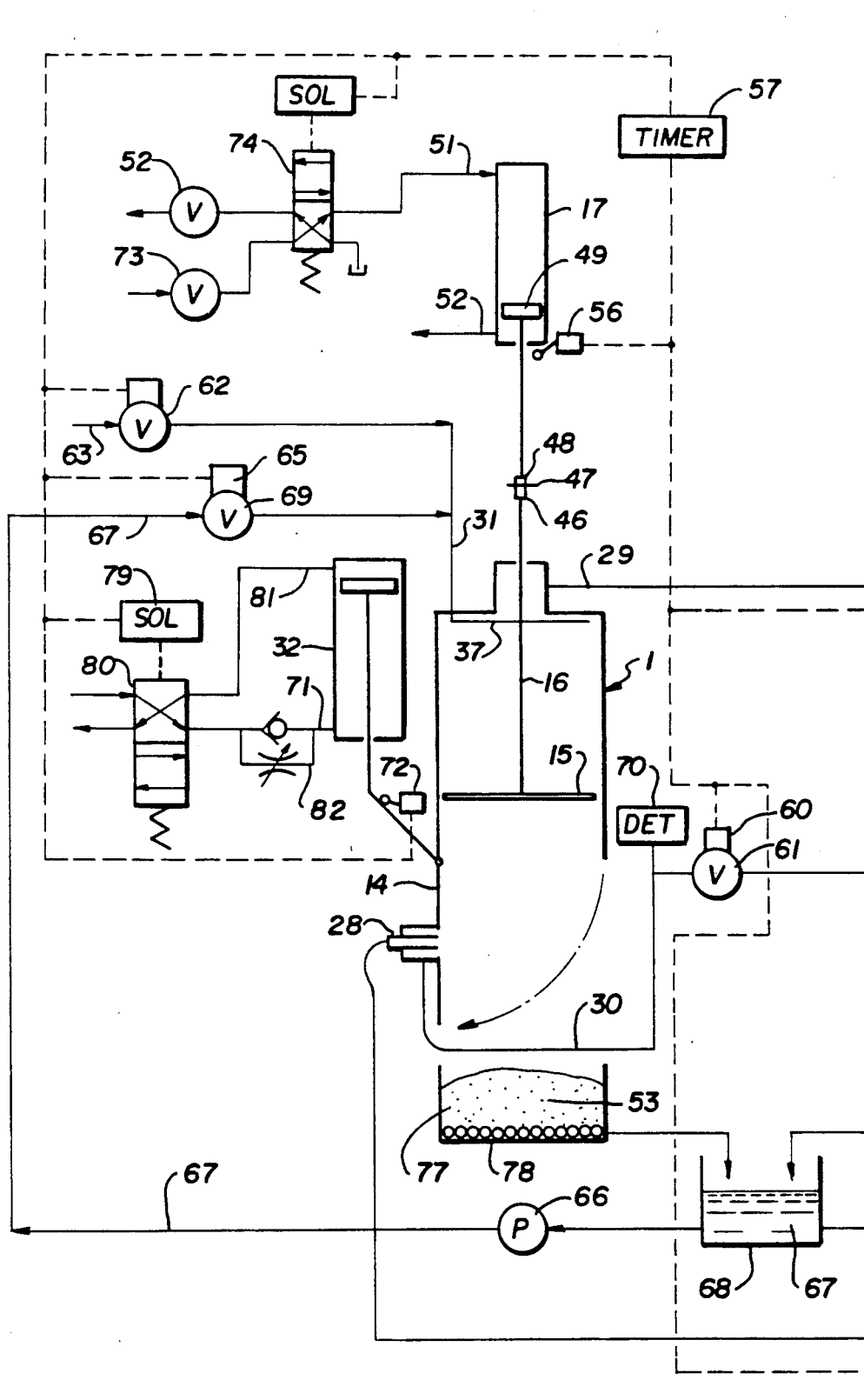
FIGS. 3A and 3B are a schematic view of the freeze concentration apparatus in accordance with the preferred embodiment.
Figure 3B:
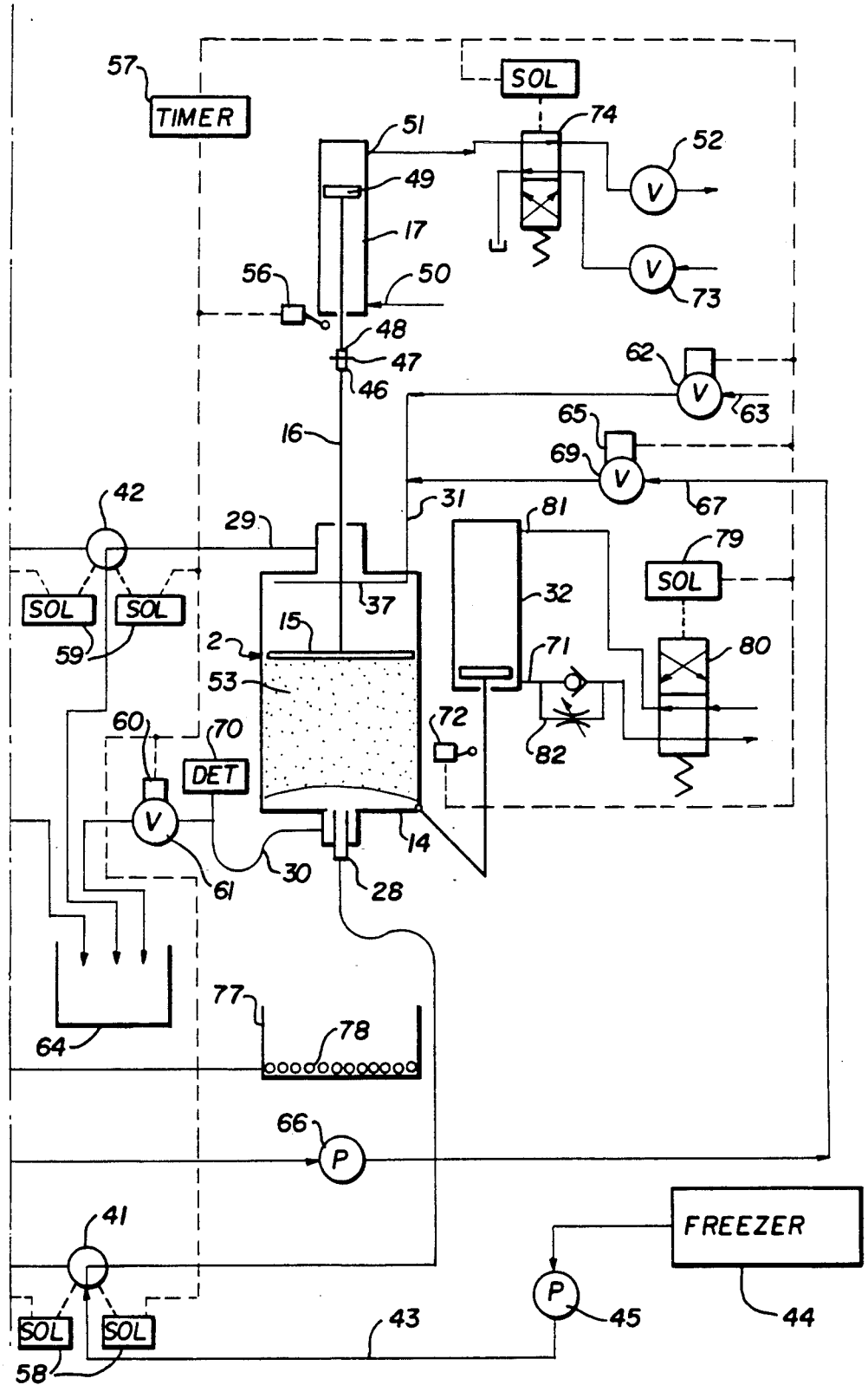

In the preferred embodiment shown in FIGS. 1-3, an annular plate 13 is provided on the lower surface of the hollow chamber 11 and the bottom 14 is constructed as a hinged lid. A bottom opening/closing assembly is provided to effect movement of the hinged lid. As shown, the opening/closing assembly may include a reciprocating cylinder 32, such as a pneumatic or hydraulic cylinder, attached at one end to the lid through lid extension 33, clevis 34, and pin 35, and pivotally attached at its opposite end to a support frame 36. Alternatively, one skilled in the art will recognize that any other opening/closing assembly could be employed, such as ropes and pulleys or ball screws. Further, the bottom need not be hinged, but could be constructed as a sliding lid.

The positions of the conduits 28,29,30 and 31 are advantageously selected to minimize dead space and maximize fluid drainage, and to maximize contact of the ice with the rinse fluids. One skilled in the art will also recognize that the conduits may communicate directly or indirectly with the container, and that the first and third conduits, and/or the second and fourth conduits may be combined, as in a "Y"-configuration with a diverter valve. Preferably, the first and third conduits 28 and 30 are on or adjacent to the bottom of the container, while the second and fourth conduits 29 and 31 are on or adjacent to the top of the container. The valve 38 positioned in the first conduit 30, may be any conventional valve, including but not limited to a swing check valve or other check valve. To enhance drainage into third conduit 30, bottom lid 14 includes annular and radial grooves 26 on its inner surface which communicate with the third conduit 30 through a plurality of axial holes 27 and annular chamber 30A. In this embodiment, the above-mentioned retaining element 24 may include a screen or mesh over the grooves 26 and holes 27. The fourth conduit 31 may also be provided with a distributor 37 such as a sparger ring or sprayer for uniformly distributing the rinse liquids and/or gases and thus improving contact of these rinse liquids or gases with the ice in the chamber 11. Shaft seals 39 and retention collars 40 may be provided to seal the passage of the fourth or other conduits into the columns.

The structure and size of the piston 15 and its perforations 23 and second retaining element 25 may be varied in accordance with the liquid treated, and are selected to allow optimal liquid and gas flow therethrough while preventing passage of ice crystals from the chamber 11. Piston 15 may have annular and radial grooves 22 on its lower surface for connecting the perforations 23 and improving liquid flow through the piston from below. To prevent leakage or channeling around the piston, a piston seal 18 may be provided adjacent the inner wall of chamber 11.

Control of the degree of compaction of the ice bed or plug 53 accumulated within the chamber 11 is achieved by an assembly for varying the downward force exerted by the piston 15. In the preferred embodiment, piston rod 16 extends from piston 15, through the top 12 of the column, and is connected to the assembly. The assembly may include but is not limited to an inverted piston 49 carried within loading cylinder 17 and having a piston rod 48 for connection to piston rod 16. By varying the pressure or load on piston 49 in cylinder 17, the downward force exerted by piston 15 in the column may be controlled in turn. Piston rods 16 and 48 may be unitary or separate but attached using connectors conventional in the art. As will be described herein below, the two piston rods are advantageously connected using coupling 46, extended washer 55, and locknut 47. Bearings 19, shaft seal 20, and cover 21 are also provided around piston rod 16 as it passes through top 12 to seal the column.

The apparatus also includes first and second receptacles 64,77. The first receptacle 64 is in fluid communication with the second and third conduits 29,30 for collecting concentrated liquid; a single, common second receptacle or a plurality of second receptacles 77 are positioned to receive ice upon moving the bottom of the column to its open position. In the event that a common second receptacle is used, a conveyor 76 having belt 75 may be positioned below the columns, catching the ice as the bottoms of the columns are opened, and transporting the same to the second receptacle. Liquid feed into the heat exchanger 44 is advantageously passed through coils 78 in the receptacle 77 for precooling by ice received therein. The ice may be disposed of or melted, with water from the melted ice held in collection vessel 68 and subsequently recycled for use as a rinse water in the freeze concentration process.

Continuous operation of the apparatus is accomplished by connecting the columns 1,2 in parallel. In the preferred embodiment, a first multi-way valve 41 is positioned in the line communicating the heat exchanger 44 with the columns, and a second multi-way valve 42 is positioned between the second conduits 29 communicating with the first receptacle. Although not shown, it is understood that the third conduits 30 for removing fluids, as well as the fourth conduits 31 for adding gases and/or rinse liquids, may be combined using multi-way valves in this manner.

Although the apparatus may be operated manually, automatic operation using a control assembly is preferred as will be described herein below.

OPERATION OF THE INVENTION

In use, with the bottom of one column closed and piston 15 at its lowest position and bottom lid 14 closed, the slurry 43 of the ice crystals and concentrated liquid is transported from the heat exchanger 44 by pump 45, through the first conduit 28 and valve 38, into the chamber 11 of the column and forcing the reciprocating piston 15 upward. Ice 53 accumulates and is retained in the chamber by the piston, while concentrated liquid 54 is forced through the perforations 23 therein, and out of the chamber through the second conduit 29 and valve 42 to the first receptacle 64. Back pressure on the piston 15 may be controlled and is chosen such that the ice bed 53 formed below the piston is compacted to a predetermined extent; port 50 of cylinder 17 is vented, and the pressure in cylinder 17 is controlled by exhausting through port 51 and back pressure valve 52.

When the piston 15 reaches its topmost position in the column, the rinse cycle begins, with air or inert gas 63 and/or rinse liquid 67 admitted into the top of the chamber via the fourth conduit 31 and distributor 37, forcing the remaining concentrated liquid in the chamber to drain through the third conduit 30 and into the first receptacle 64. Ice 53 in the chamber 11 is prevented from passage into the third conduit 30 by the above-mentioned first retaining element 24. Automatic initiation of the rinse cycle occurs as piston 15 reaches its topmost position and washer 55 engages limit switch 56, which in turn resets a multi-cam, single cycle timer 57. This timer 57 controls all or most phases of the rinse cycle. As a first step under the control of the timer 57, solenoid 60 opens valve 61 and solenoid valve 62 admits air or inert gas 63 into the fourth conduit 31 and distributor 37, forcing remaining concentrated liquid 54 to drain through the third conduit 30 into the first receptacle. Solenoid valve 62 then closes and solenoid 65 and pump 66 are energized, opening valve 69 and causing rinse water 67 to be pumped from melt collection receptacle 68 to the fourth conduit 31 and distributor 37. This step of rinsing with water may be followed by another air or inert gas rinse. After a predetermined time period as measured by the timer 57, or in the alternative, after a predetermined concentration of the liquid 54 is measured by detector 70, solenoid valves 69 and/or 62 are closed and pump 66 is stopped. After another predetermined period of time to allow for drainage, solenoid valve 61 is also closed, completing the rinse cycle.

Following this rinse cycle, the bottom lid 14 of the column is moved to its open position, allowing the relatively pure ice bed 53 to drop into the second receptacle 77. This dumping of the ice bed may be aided by downward force applied upon the piston 15. Opening of the bottom lid 14 and dumping of the ice bed 53 may also be under the automatic control of the timer 57. Initially, port 71 of reciprocating element 32 is pressurized, opening the bottom lid 14. When the bottom lid 14 comes to its fully open position it engages limit switch 72, and the four-way solenoid control valve 74 changes state, pressurizing port 51 of cylinder 17. Pressure regulating valve 73 functions to regulate the pressure in the cylinder 17. This pressurization leads to a controlled extension of piston 15 and ejection of the ice bed 53. After the ice bed 53 has been dumped from the column, the column is ready for return to its starting condition for repeating the process. Again under automatic control, solenoid 79 on four-way solenoid valve 80 is energized, resulting in venting of port 71 of reciprocating element 32 and pressurization of port 81. Flow control valve 82 may be provided to ensure that bottom lid closes gently. Finally, four-way solenoid valve 74 is de-energized, returning the column to its starting position.

As previously mentioned, at least a pair of columns are preferably employed and operate in paralle. In this event, when the piston 15 in a first column reaches its aforementioned topmost position, the slurry 43 from the heat exchanger 44 is subsequently directed into a second and/or plural parallel columns in their starting position. Changing flow between the columns may also be under automatic control, with the timer 57 causing solenoids 58 and 59 to be energized, and three-way valves 41 and 42 to change state. Operation of the second and any other columns proceeds in the same manner as described for the first column above. Upon completion of the rinse cycle and dumping of the ice from the first column, and the piston 15 in the second column reaching its topmost position, three-way valves 41 and 42 again change state, and the flow of the slurry 43 is directed into the first column and the process repeated. One skilled in the art will recognize that by using a plurality of the separation and rinse columns in parallel in this manner, a continuous freeze concentration process may be achieved.

It is understood that the foregoing detailed description is given merely by way of illustration and that modifications and variations may be made therein without departing from the spirit and scope of the invention. For example, the practitioner skilled in the art will recognize that control assembly is not limited to the limit switches and detectors described herein, and other switches, detectors, or other control elements conventional in the art could be used. Further, the extended washer 55 engaging or tripping limit switch 56 could be replaced with an adjustable flange on the piston rods 16 or 48 to allow variation of maximum height of the ice bed in the column.

We claim:

1. An apparatus for separating and rinsing ice crystals from a concentrated liquid comprising:
   a. a container having a hollow chamber, a top, and a bottom moveable between an open and a closed position,
   b. first conduit means communicating with a lower portion of said container for adding fluid in said chamber while said bottom is in said closed position,
   c. valve means on said first conduit means,
   d. second conduit means communicating with an upper portion of said container for removing fluid in said chamber,
   e. third conduit means communicating with the lower portion of said container for removing a fluid from said chamber while said bottom is in said closed position, said third conduit means further having means for retaining ice crystals in said container,
   f. a reciprocating piston inside said chamber, said piston adapted to allow the passage of liquids and gases through said piston while preventing the passage of ice crystals,
   g. fourth conduit means communicating with the upper portion of said container for adding fluid to said chamber.

2. An apparatus as described in claim 1, further comprising means connected to said piston for varying the downward force of said piston.

3. An apparatus as described in claim 1, wherein said piston has perforations therethrough.

4. An apparatus as described in claim 3, wherein said perforations have a cross-section effective to allow the passage of liquids and gases while preventing the passage of ice crystals.

5. An apparatus as described in claim 1, wherein said piston includes a second means for retaining ice crystals.

6. An apparatus as described in claim 5, wherein said second means for retaining comprises a screen or sieve on said piston.

7. An apparatus as described in claim 1, wherein said fourth conduit means further comprises distributor means within said chamber for uniformly distributing fluid into the upper portion of said chamber.

8. An apparatus as described in claim 1, wherein said bottom is attached to said chamber by a hinge.

9. An apparatus as described in claim 8, further comprising means for opening and closing said bottom.

10. An apparatus as described in claim 9, wherein said means for opening and closing comprises a reciprocating element attached to said bottom.

11. An apparatus for freeze concentration of liquids selected from the group consisting of solutions, emulsions and slurries, comprising, in combination:
   a. heat exchanger means for freezing said liquid to form a slurry of ice crystals and concentrated liquid,
   b. at least one separating and rinsing column comprising:
      1) a container having a hollow chamber, a top, and a bottom moveable between an open and a closed position,
      2) first conduit means communicating with a lower portion of said container for removing fluid in said chamber while said bottom is in said closed position,
      3) valve means on said first conduit means,
      4) second conduit means communicating with an upper portion of said container for adding fluid in said chamber,
      5) third conduit means communicating with the lower portion of said container for removing a fluid from said chamber while said bottom is in said closed position, said third conduit means further having means for retaining ice crystals in said container,
      6) a reciprocating piston inside said chamber, said piston adapted to allow the passage of liquids and gases through said piston while preventing the passage of ice crystals,
      7) fourth conduit means communicating with the upper portion of said container for adding fluid to said chamber,
   c. line means connecting said heat exchanger means with said first conduit means,
   d. first receptacle means in communication with said second conduit means and said third conduit means, said receptacle means receiving fluid from said chamber,
   e. second receptacle means positioned below said separating and rinsing column for receiving ice from said container when said bottom is moved to said open position.

12. An apparatus as described in claim 11, further comprising means connected to said piston for varying the downward force of said piston.

13. An apparatus as described in claim 11, wherein said piston has perforations therethrough.

14. An apparatus as described in claim 13, wherein said perforations have a cross-section effective to allow the passage of liquids and gases while preventing the passage of ice crystals.

15. An apparatus as described in claim 11, wherein said piston includes a second means for retaining ice crystals.

16. An apparatus as described in claim 15, wherein said second means for retaining comprises a screen or sieve on said piston.

17. An apparatus as described in claim 11, wherein said fourth conduit means further comprises distributor means within said chamber for uniformly distributing fluid into the upper portion of said chamber.

18. An apparatus as described in claim 11, wherein said bottom is attached to said chamber by a hinge.

19. An apparatus as described in claim 18, further comprising means for opening and closing said bottom.

20. An apparatus as described in claim 19, wherein said means for opening and closing comprises a reciprocating element attached to said bottom.

21. An apparatus as described in claim 11, further comprising automatic control means.

22. An apparatus as described in claim 11, further comprising a plurality of said separating and rinsing columns connected in parallel.

* * * * *